Aug. 25, 1953 — F. J. JOHNS ET AL — 2,650,316
SKEWED STATOR CONSTRUCTION
Filed July 12, 1950

WITNESSES:
Edward Michaels
W. L. Groove

INVENTORS
Francis J. Johns &
Alois Jokl.
BY O. B. Buchanan
ATTORNEY

Patented Aug. 25, 1953

2,650,316

UNITED STATES PATENT OFFICE 2,650,316

SKEWED STATOR CONSTRUCTION

Francis J. Johns and Alois Jokl, Buffalo, N. Y., assignors to Westinghouse Electric Corporation, East Pittsburgh, Pa., a corporation of Pennsylvania Application July 12, 1950, Serial No. 173,368

2 Claims. (Cl. 310—258)

Our invention relates to a special kind of skewed-stator construction which is applied to an electric motor or other dynamo-electric machine of a type having a rigid cylindrical framering which constitutes an imperforate enclosure-ring for the machine, and a stator-core which consists of a rigidly held stack of similarly punched stator-laminations fitting within the inside of the frame-ring.

In accordance with our invention, the stator-laminations are provided with straight axially extending tension-rods which are disposed at a plurality of points around the laminations, and each lamination is provided with rod-receiving slots, each slot having a circumferential width which is sufficient to admit of the desired amount of skewing of the winding-receiving slots which are provided at the bore of the laminations. Thus, when the laminations are being stacked in a skewed fashion, each tension-rod will be near one circumferential end of its rod-receiving slot at one end of the stack, and near the other circumferential end of its rod-receiving slot at the other end of the stack. The bottoms of these rod-receiving slots are at all points accurately spaced by identical distances from the stator-axis and the stator-bore, thus causing the tension-rods to be similarly accurately spaced. Consequently, we can secure the bracket-retaining bolts, for holding the two end brackets of the machine in place, by screwing them into the ends of these tension-rods, thus making it possible to assemble and disassemble the bracket without disturbing the tension-rod holding of the compressed lamination-stack.

With the foregoing and other objects in view, our invention consists in the structures, combinations, systems, methods, and parts, hereinafter described and claimed, and illustrated in the accompanying drawing, wherein:

Figure 1:
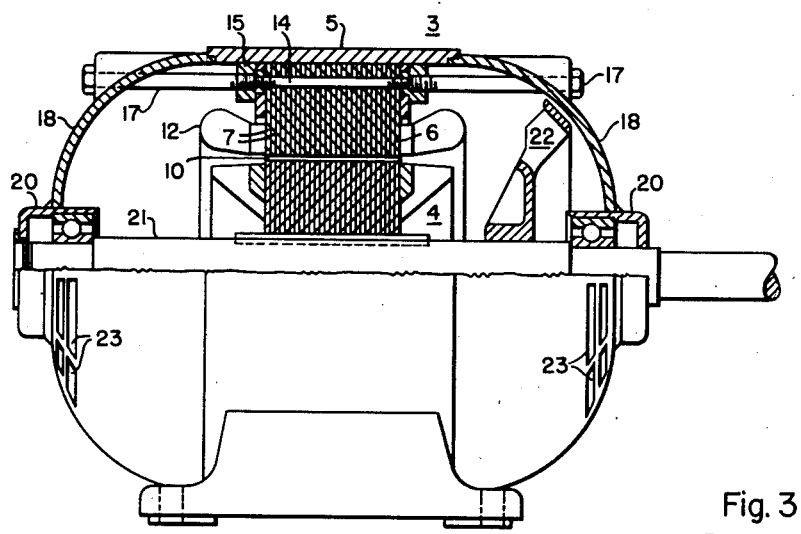
Figure 1 is a longitudinal sectional view of a form of illustrative embodiment of our invention.
Figure 3:
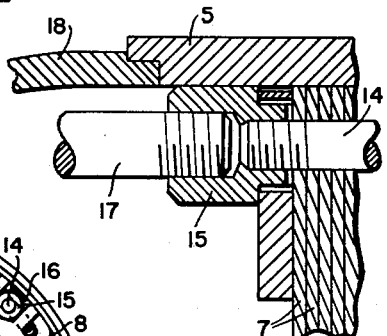
Fig. 3 is a fragmentary longitudinal sectional view, on a larger scale, corresponding to the upper part of Fig. 1.

We have illustrated our invention in connection with a squirrel-cage type of induction motor, comprising a stator-member 3 and a rotor-member 4. The stator-member has a rigid cylindrical frame-ring 5 which constitutes an imperforate enclosure-ring, and a stator-core 6. The stator-core 6 comprises a rigidly held stack of similarly punched stator laminations or punchings 7. The outer periphery of these stator-punchings 7 fit, at a plurality of spaced points 8, within the inside of the frame-ring 5, usually with a tight fit, known as an interference-fit. At other peripheral points, the stator-laminations 7 are spaced from the inside of the frame-ring, so as to provide a plurality of axially extending ventilating-ducts 9 between the stator-core and the frame-ring.

The stator-laminations 7 have a bore at the airgap 10 of the machine, and these laminations have winding-receiving slots 11 at the bore, for receiving the stator-winding 12, in accordance with usual practice.

In accordance with our invention, the fitting-points 8 of the stator-laminations 7 are provided with rod-receiving slots 13, each of which is mounted on a straight axially extending tension-rod 14. The stator-laminations 7 are stacked on these tension-rods 14 in a skewed fashion, and the rod-receiving slots 13 have a circumferential width which is sufficient to admit of the desired amount of skewing of the winding-receiving slots 11, so that each tension-rod 14 is near one circumferential end of its rod-receiving slot 13 at one end of the stack, and near the other circumferential end of its rod-receiving slot at the other end of the stack.

In referring to the winding-receiving slots 11 and the rod-receiving slots 13, we use the term "slot" in a generic sense as covering any opening, whether it is completely closed at all sides, or whether it is open or partially open at its inner or outer peripheral edge, as the case may be, so as to provide a notch which opens on the inner periphery or bore of the stator-laminations, or upon the outer periphery of the frame-fitting points 8 of these laminations, as the case may be.

Figure 2:
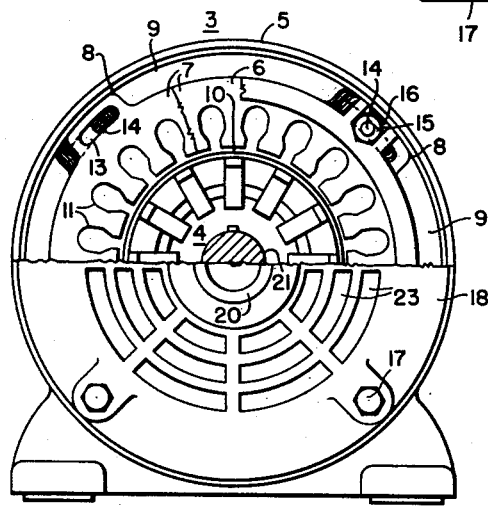
Fig. 2 is an end view of the illustrated motor, with the top half of the bracket cut away, and other parts cut away and omitted, to illustrate the construction of the stator-laminations.

The ends of the tension-rods 14 are provided with any suitable core-holding means such as nuts 15, which hold the rods in tension, while tightly compressing the stack of stator-laminations 7. These nuts 15, when tightened in place, may be welded, as shown at 16 in Fig. 2, to hold them rigidly with respect to the frame-ring 5. The bottoms of the rod-receiving slots 13 are at all points accurately spaced so as to be at identical distances from the stator-axis and the stator-bore, so that the axially extending tension-rods 14 are also accurately spaced or centered with respect to the stator-axis and the stator-bore. Thus it is possible to use the terminal nuts 15 of these tension-rods 14 as bracket-assembly means, for receiving the inner ends of the bracket-retaining bolts 17 which removably hold the two end brackets 18 which are removably mounted on the frame-ring 5, one bracket at each end of the machine, as is shown in a Goodwin and Ludwig Patent 2,447,645, granted August 24, 1948.

The end brackets 18 carry bearings 20, which support the rotor-shaft 21. One end of this rotor-shaft 21, within one of the end brackets 18, is provided with a fan 22 which acts as a blower-means for causing an axial airflow through the ventilating ducts or spaces 9 between the inside of the frame-ring 5 and the outer peripheries of the stator-laminations 7. To admit of this axial ventilation of the motor, the bottom hemispheres of the end brackets 18 are provided with ventilating openings 23.

While we have illustrated our invention in a single illustrative form of embodiment, which is believed to be typical, we wish it to be understood that our invention is not limited, in its broadest aspects, to the precise details which are shown, or to any particular size or type of machine. We desire, therefore, that our appended claims shall be accorded the broadest construction consistent with their language.

We claim as our invention:

1. A dynamo-electric machine having a stator member and a rotor member, the stator member including a frame structure and a core member, the core member being mounted in the frame structure and comprising a stack of annular laminations having slots in their inner peripheries, each lamination having a plurality of arcuate, circumferentially spaced slots adjacent its outer periphery, the last-mentioned slots being accurately concentric with the axis of the stator member, and a plurality of straight, axial tension rods extending through the arcuate slots for compressing the stack of laminations, the laminations being stacked in skewed fashion so that at one end of the stack of laminations the tension rods are near one end of the arcuate slots and at the other end of the stack the tension rods are near the other end of the arcuate slots.

2. A dynamo-electric machine having a stator member and a rotor member, the stator member including a frame structure and a core member, the core member being mounted in the frame structure and comprising a stack of annular laminations having slots in their inner peripheries, each lamination having a plurality of arcuate, circumferentially spaced slots adjacent its outer periphery, the last-mentioned slots being accurately concentric with the axis of the stator member, a plurality of straight, axial tension rods extending through the arcuate slots for compressing the stack of laminations, the laminations being stacked in skewed fashion so that at one end of the stack of laminations the tension rods are near one end of the arcuate slots and at the other end of the stack the tension rods are near the other end of the arcuate slots, end brackets at each end of the frame structure, bearings in said end brackets for supporting the rotor member, and means for securing the end brackets to the tension rods.

FRANCIS J. JOHNS.
ALOIS JOKL.

References Cited in the file of this patent

UNITED STATES PATENTS

| Number | Name | Date |
| --- | --- | --- |
| 1,674,876 | Thompson | June 26, 1928 |
| 1,843,315 | Blish et al. | Feb. 2, 1932 |
| 2,447,645 | Goodwin | Aug. 24, 1948 |
| 2,470,767 | Ellis | May 24, 1949 |